United States Patent [19]

Ohara et al.

[11] Patent Number: 4,508,439

[45] Date of Patent: Apr. 2, 1985

[54] SINGLE LENS REFLEX CAMERA

[75] Inventors: Tsunemasa Ohara, Tokyo; Masayuki Suzuki; Masayoshi Yamamichi, both of Kanagawa, all of Japan

[73] Assignee: Canon Kabushiki Kaisha, Tokyo, Japan

[21] Appl. No.: 421,406

[22] Filed: Sep. 22, 1982

[30] Foreign Application Priority Data

Oct. 6, 1981 [JP] Japan ............................... 56-159183

[51] Int. Cl.³ ............................................ G03B 19/12
[52] U.S. Cl. .................................................. 354/154
[58] Field of Search ......................... 354/23 R, 54-56, 354/59, 152, 402, 479, 406, 407, 154

[56] References Cited

U.S. PATENT DOCUMENTS 3,468,233  9/1969  Schmidt ............................... 354/55
4,320,945  3/1982  Kimura ............................. 354/23 R Primary Examiner—William B. Perkey
Attorney, Agent, or Firm—Toren, McGeady and Stanger

[57] ABSTRACT

Disclosed is a single lens reflex camera which compresses a view finder mirror having a portion for allowing light passage therethrough, a movable support member supporting the mirror having a portion for allowing light passage therethrough, and first and a second light shielding member arranged upon retraction of the mirror from the picture taking optical path by the support to cooperate with each other to shut the light passage portion of the support member.

6 Claims, 3 Drawing Figures

SINGLE LENS REFLEX CAMERA

BACKGROUND OF THE INVENTION

1. Field of the Invention

This invention relates to single lens reflex cameras and more particularly to a single lens reflex camera which is equipped with a view finder mirror having a portion for allowing light passage therethrough, a support member for the mirror having a portion for allowing light passage therethrough and a light shielding member positioned on the opposite side of the support member to the mirror to open and close the light passage portion of the support member.

2. Description of the Prior Art

The aforesaid type single lens reflex camera has already been disclosed in Japanese patent application No. Sho 54-89113 (Japanese Laid-Open Patent Publication No. Sho 56-12626) assigned to the same assignor.

That is, the single lens reflex camera described in the specification of this patent application includes a main or view finder mirror having a light-permeating property in at least a portion thereof as a light passage allowing portion and is supported by a movable first supporting member having an opening for light passage as a light passage allowing portion, an auxiliary mirror supported by a movable second supporting member for reflecting the light passed through the opening of the first supporting member incident upon a photosensitive element when the main mirror is positioned in the optical path of a picture taking optical system by the first supporting member. In other words, when in a viewing position, or in a non-shooting position, a light shielding member shuts the opening of the first supporting member when shooting, or more strictly speaking, when the main mirror is restricted by the first supporting member, and the auxiliary mirror is restricted by the second supporting member, each is toward the outside of the picture taking optical path.

In prior camera art, it is generally required that their mirror boxes are light tight with respect to other light than that coming from the picture taking optical systems, for example, light entering backward through an eyepiece. This is necessary to ensure that the film is exposed only by the light from the picture taking optical system.

With respect to the single lens reflex camera described in the above referred to Japanese patent application, as far as the ideal design is concerned, the size of the light shielding member may be of a sufficiently large size relative to the opening for the light passage formed in the aforesaid first support member so that light-tightness can be secured. In actual practice, however, with regard to the light shielding member, for example, to allow for avoidance of mechanical interference with the auxiliary mirror and because, in the aforesaid viewing position, it is required that the light beam going from the auxiliary mirror to the photosensitive element be safe from any influences, a much-desired increase cannot be effected. With respect to the aforesaid light passage opening, on the other hand, if this is made smaller, the amount of light incident upon the photosensitive element is reduced. Therefore, this cannot be decreased as much as desired. Thus, the designer must, under considerable restrictions, determine the size of each of the openings and the light shielding members within very narrow ranges of numerical values.

Consideration of the tolerances for each design parameter within which the opening and light shielding members may be manufactured and later assembled economically, result in an increase in the percentage of complete mirror boxes which will be found unacceptable because of the lack of sufficient light-tightness.

With situations described above in mind, an object of the present invention is to provide an improved single lens reflex camera making it possible to reduce the possibility of the drawbacks described above.

Another object of the present invention is to provide a single lens reflex camera in which a view finder mirror having a portion for allowing light passage therethrough is supported by a movable supporting member having a portion for allowing light passage therethrough, while still permitting a novel improvement ensuring the required degree of light-tightness during photographing.

According to the present invention, a single lens reflex camera is proposed which includes a view finder mirror having a portion for allowing light passage therethrough and supported on a movable supporting means having a portion for allowing passage of light therethrough, and first and second light shielding means cooperating with each other to shut the light passage allowing portion of the supporting means so that the mirror is retracted from the picture taking optical path by the supporting means.

A further object of the present invention is to provide full assurance for the mirror box light-tightness under the above-described object and features by using a simpler structure, therefore, without involving any unduly large increases in the complexity and bulk of the mechanisms within the camera and by very low unit cost production techniques.

According to a preferred embodiment of the present invention which will be described more fully later, a form is employed whilst the aforesaid first light shielding means is movable relative to the light passage allowing portion of the supporting means as in the prior art. The aforesaid second light shielding means remains stationary relative to the light passage allowing portion of the supporting means during the mirror operation.

In this case, the aforesaid fixed or second light shielding means may be constructed in the form of, for example, a mask member. Also, in this case, for the purpose of protecting the mask member from damage due to external shocks, it is advantageous to place the mask member between the mirror and the supporting means. Furthermore, in this case, it is an advantage that the mask member is very thin, or, for example, an opaque foil-like shape. The use of the fixed or second light shielding means in the form of a mask member gives the following additional advantage. When the movable or first light shielding means is in a position away from cooperation with the fixed or second light shielding means, or in a position where the light passage allowing portion of the supporting means is not shut, some of the light rays arriving at the light passage allowing portion are reflected from the side wall of the light passage allowing portion (i.e. opening) as harmful rays of light within the normal emerging light rays can be substantially prevented from occurring by the second light shielding means.

To facilitate a further advance in completely closing off the light passage allowing portion of the supporting means, it is advantageous to construct the movable or first light shielding means to nest at least a portion thereof within the light passage allowing portion (opening) of the supporting means. Of course, in this case, the fixed or second light shielding means takes the aforesaid form of the mask member between the mirror and the supporting means. It is to be noted that the mask member may be made of an elastic material such as rubber. That is, it is also an advantage that the mask member also serves as a shock absorber for the first light shielding means.

The foregoing concrete features are all fully disclosed in the following description of preferred embodiment of the invention.

These and other objects and features of the present invention will become apparent from the following description taken in conjunction with the accompanying drawings.

SUMMARY OF THE INVENTION

These and other objects of the invention may be attained in a single lens reflex camera which includes a picture taking lens system defining a picture taking optical path, a reflection mirror having a portion for allowing passage of light therethrough, and supporting means for supporting the mirror. The supporting means has a portion for allowing passage of the light coming through the light passage allowing portion of the mirror and is movable to position the mirror in the picture taking optical path and to retract the mirror out of the picture taking optical path. The apparatus includes first and second light shielding means which cooperate with each other to close off the light passage allowing portion of the supporting means when the mirror is retracted out of the picture taking optical path by the supporting means.

BRIEF DESCRIPTION OF THE DRAWINGS

The present invention will be described in connection with preferred embodiments thereof by reference to the drawings in which.

DETAILED DESCRIPTION OF THE PREFERRED EMBODIMENTS

Figure 1:
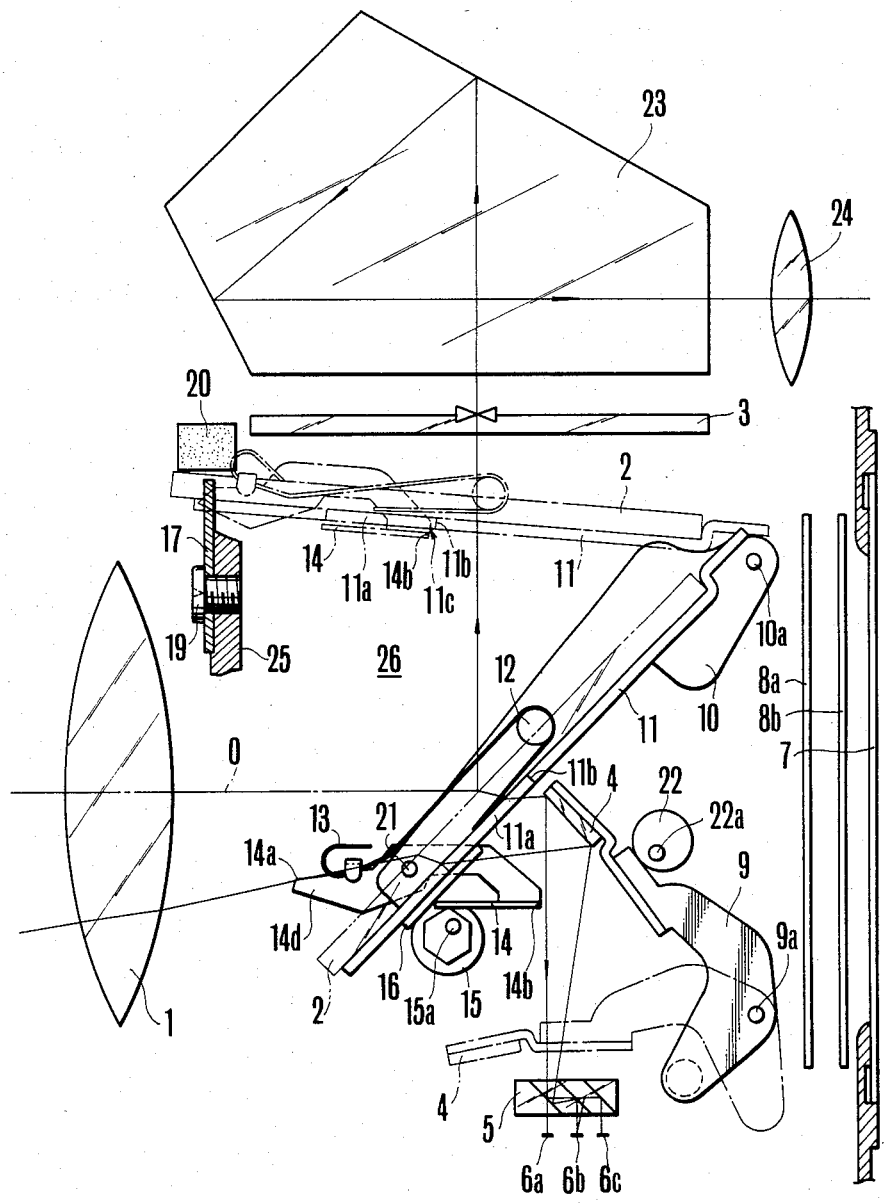
FIG. 1 is a sectional elevational view of the single lens reflex camera disclosed in the preceding Japanese patent application.

Referring to FIG. 1, an outline of the single lens reflex camera disclosed in the preceding Japanese patent application No. Sho 54-89113 (U.S. patent application Ser. No. 166,969, filed July 8, 1980, now U.S. Pat. No. 4,348,088, issued Sept. 7, 1982) is given below. In FIG. 1, reference numeral 1 identifies a picture taking objective lens and a main or view finder mirror 2 has a light permeable property in part or as a whole in the light passage allowing portion. When in a viewing position illustrated by solid lines, the mirror 2 reflects a light beam L1 entering through the objective lens 1 to a focusing screen 3 constituting a view finder optical system together with a penta prism 23 and an eyepiece 24, reference numerals 8a and 8b identify shutter curtains and reference numeral 7 identifies a film. An auxiliary mirror 4 is fixedly carried on a supporting means in the form of a lever arm 9 rotatable about a pivot pin 9a and reflects the light passing through a portion of the main mirror 2 (accurately speaking, through an opening 11a as a light passage allowing portion of a mirror backplate 11 to be described later) to a light receiving system of a focus detecting device including a beam splitter 5 and photosensitive elements 6a, 6b and 6c. Of the three photosensitive elements 6a, 6b and 6c, the element 6b is positioned optically equivalent to the film plane, while the elements 6a and 6c take their optical places forward and rearward respectively at a certain distance from the film plane. The output signals from these three photosensitive elements 6a, 6b and 6c are used in detecting a focus condition (for example, by the method described in Japanese Laid-Open Patent Publication No. Sho 55-155308 (U.S. patent application Ser. No. 151,533, filed May 19, 1980, now U.S. Pat. No. 4,341,953, issued July 27, 1982)). But, its detailed explanation is omitted here since it is not essential to the present invention. Reference numeral 10 identifies a pivotal arm for the main mirror 2 rotatable about a shaft 10a and 11 is a backplate for the main mirror 2 formed as a unit with said arm 10. The parts 10 and 11 constitute a supporting means for the main mirror 2. A light shielding plate 14 is pivotally mounted to the sides of the main mirror supporting means (10,11) by a shaft 21 at a portion of its pivotal arm 14d. A spring 13 urges the light shielding plate 14 and its pivotal arm 14d to turn about the shaft 21 in a clockwise direction. A stub 12 is fixedly mounted to the side of the main mirror supporting means (10,11) on which the spring 13 is wound. Eccentric pins 15 and 22 adjust the angular positions of the main mirror 2 and the auxiliary mirror 4 respectively when they are turned about respective axes 15a and 22a. A rubber piece 16 absorbs a shock when the main mirror 2 is returned from a non-viewing to a viewing position. A stopper 17 makes an exposure as the main mirror 2 is retracted from the picture taking optical path of the objective lens 1. The light shielding plate 14 is turned about the shaft 21 against the force of the spring 13 to shut the opening 11a of the mirror backplate 11 by the stopper 17 engaging the tail 14a of the pivotal arm 14d of the light shielding plate as illustrated by dashed lines. The stopper 17 is fixedly secured by a screw fastener 19 to a portion of a framework 25 forming a mirror box 26. A buffer member 20 is made of a soft material such as sponge and absorbs a shock at the time of an upward movement of the main mirror 2 and of sealing off the mirror box 26 from the harmful light from the finder.

In the single lens reflex camera of this type, during the exposure the main mirror 2 is moved out of the picture taking optical path of the objective lens 1 to a position illustrated by dashed lines where the opening 11a of the main mirror backplate 11 is covered by the light shielding plate 14. It should be pointed out here that there is a possibility of an accidental offset of the light shielding plate 14 to the opening 11a with the creation of a slight gap 11c between the opening edge 11b and the top end 14b of the plate 14. If so, a harmful light entering backward through the eyepiece 24 leaks into the interior of the mirror box 26 through the gap 11c and is a bad influence on the exposure of the film 7. As is evident from FIG. 1, in order to avoid the light leaking from the gap 11c, the top end of the light shielding plate 14, indicated by 14b, may be elongated. If so, however, the light beam from the auxiliary mirror 4 to the light receiving system (5, 6a–6c), the focus detecting device is partly mutilated so that there is a possible failure of accurate focus detection. On the other hand, reverse light entrance may be otherwise prevented by positioning the edge of the opening 11a of the mirror backplate 11, which is indicated at 11b nearer the optical axis O of the objective lens 1, or by shortening the longitudinal length of the opening 11a to definitely overlap the top end 14b of the light shielding plate 14. But, as the edge surface 11b approaches the optical axis O, when observing the finder image, with the main mirror 2 lying in the picture taking optical path of the objective lens 1, the edge surface 11b reflects light other than the focus detecting light beam to the aforesaid light receiving system (5, 6a-6c) as a harmful light, thereby accurate focus detection cannot be carried out. Also, the edge surface 11b necessitates considerable thickness to ensure sufficient rigidity of the backplate 11. Therefore, the problem of producing disturbing light due to reflection from the edge surface 11b becomes more and more serious.

Next, the embodiments of the present invention which have overcome the above-described drawbacks of the conventional camera will be described.

Figure 2:
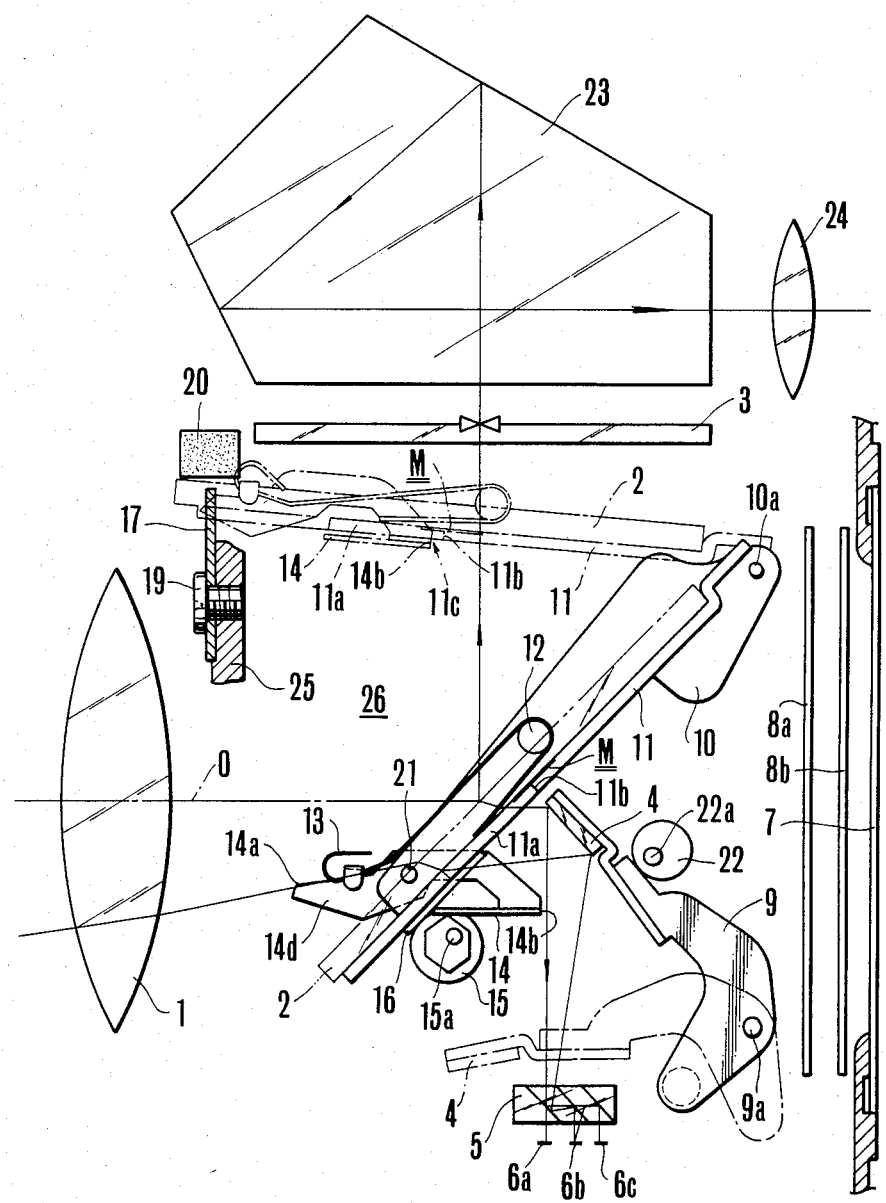
FIG. 2 shows a first embodiment of the present invention.

FIG. 2 illustrates a first embodiment of the present invention where all the parts except a mask member M are similar in construction to those shown in FIG. 1.

The mask member M is between the main mirror 2 and the backplate 11 in fixed relation to the opening 11a to completely shut the opening 11a of the main mirror backplate 11 in cooperation with the light shielding plate 14, that is, concretely speaking, to seal the gap 11c resulting from the misalignment of the top end 14b of the light shielding plate 14 to the edge 11b of the opening 11a, mentioned in connection with FIG. 1, as illustrated by the dashed lines in FIG. 2. The mask member M may be a thin layer on the order of, for example, 0.05 mm which does not permeate light (for example, an opaque metal foil) so that the area of the edge surface is small and, therefore, the harmful light reflected is small enough to be neglected. Furthermore, the mask member M may adhere to the main mirror 2 or to the main mirror backplate 11, and this makes possible a fine position adjustment relative to the optical axis O when the main mirror 2 is in the picture taking optical path.

It is to be noted that a mask layer of the same light impermeability as the mask member M may be directly formed on the back of the main mirror 2, for example, by printing means to effect an equivalent result.

Figure 3:
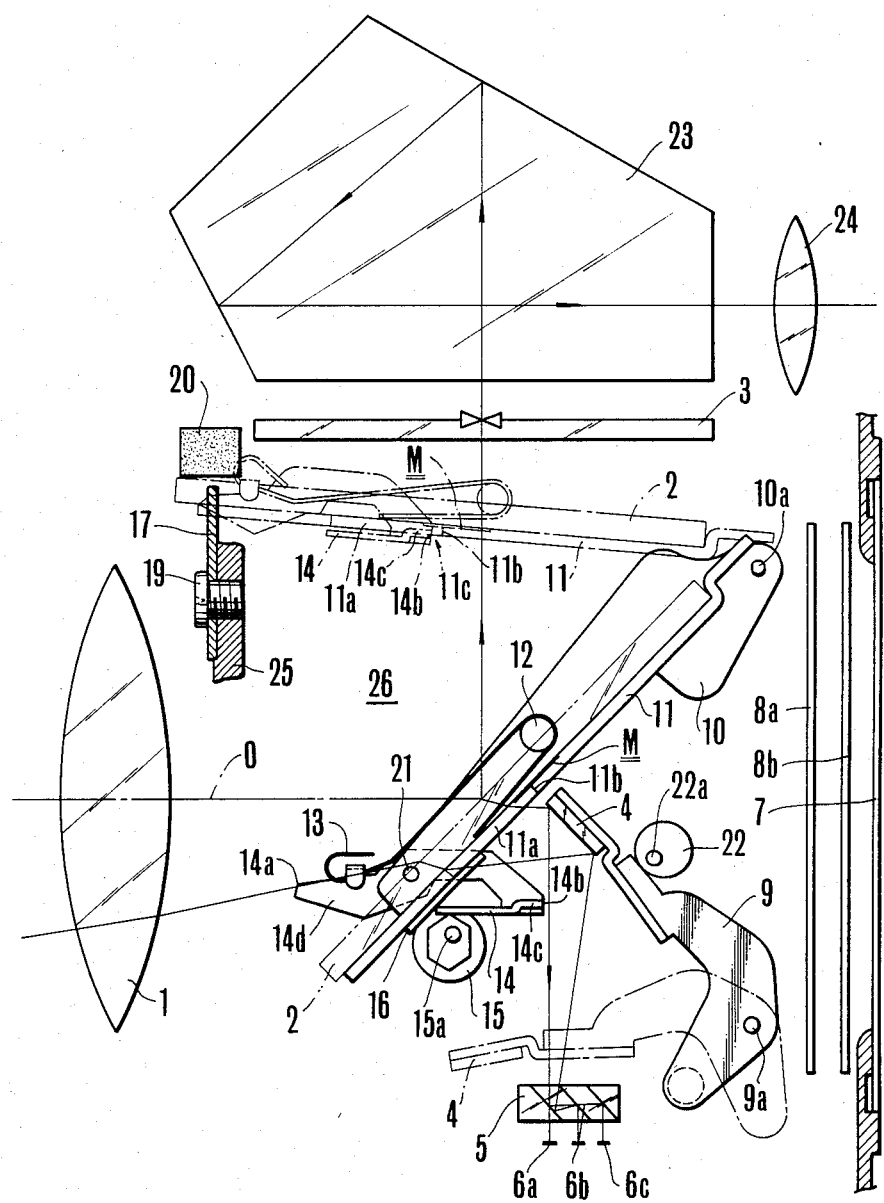
FIG. 3 shows a second embodiment of the present invention.

FIG. 3 illustrates a second embodiment of the present invention in which the light shielding plate 14 is bent in a portion 14c near the top end 14b thereof so that during an exposure with the main mirror 2 lying out of the picture taking optical path, this bent portion 14c is nested within the opening 11a of the main mirror backplate 11. Thereby the mask member M and the top end 14b of the light shielding plate 14 are placed closer to each other. Thus, the light shielding effect is further improved. The other constructional features are similar to those shown in FIG. 2.

In the embodiments described in connection with FIGS. 2 and 3, the light shielding plate 14 constitutes a movable or first light shielding means for the opening 11a (the light passage allowing portion) of the mirror supporting means (10,11), while the mask member M constitutes a fixed or second light shielding means relative to the opening 11a, which though being independent of the first light shielding means, cooperates with the first light shielding means to close the opening 11a.

In the second embodiment shown in FIG. 3, instead of the thin metal film, the mask member M may be otherwise formed by using an elastic material such as rubber having somewhat greater thickness with the advantage that it also functions to absorb the shock against the light shielding plate 14.

As has been described in greater detail above, according to the improvements of the present invention, in the single lens reflex camera equipped with a view finder mirror having a light passage allowing portion and a movable supporting means for the mirror having a light passage allowing portion during an exposure, closing off the light passage allowing portion of the supporting means can be performed more reliably than was possible in conventional structures, and great advantages can be expected from application to such a camera.

What we claim:

1. A single lens reflex camera comprising:
   (A) a picture taking lens system defining a picture taking optical path;
   (B) a first mirror having a portion for allowing passage of a light therethrough;
   (C) supporting means for supporting the first mirror, said supporting means having a portion for allowing passage of the light coming through the light passage allowing portion of the first mirror and being movable to position the first mirror in said picture taking optical path and to retract the first mirror out of said picture taking optical path;
   (D) photoelectric means sensitive to light;
   (E) a second mirror for reflecting the light coming through the light passage allowing portion of said supporting means;
   (F) first light shielding means movable relative to said light passage allowing portion of said supporting means, said first light shielding means closing below said light passage allowing portion of said supporting means when the first mirror is retracted out of the picture taking optical path by the supporting means; and
   (G) a second light shielding means for preventing the reflected light from an edge of said allowing portion of said supporting means from entering said photoelectric means, and wherein said second shielding means includes a mask made of opaque thin film.

2. A camera according to claim 1, wherein said opaque thin film includes an opaque metallic thin film.

3. A camera according to claim 1 or 2, wherein said thin film is formed directly on that surface of said mirror which confronts said supporting means.

4. A camera according to claim 3, wherein said first light shielding means includes a light shielding plate member and said plate member has a portion which is able to enter into the light passage allowing portion of said supporting means.

5. A camera according to claim 1, wherein said mask member includes a plate-like member having elasticity.

6. A camera according to claim 1, or 2, or 5, wherein said first light shielding means includes a light shielding plate member and said plate member has a portion which is able to enter into the light passage allowing portion of said supporting means.

* * * * *